(No Model.)
J. W. HAWKINS.
TOBACCO PLANT SETTER.
No. 331,498. Patented Dec. 1, 1885.
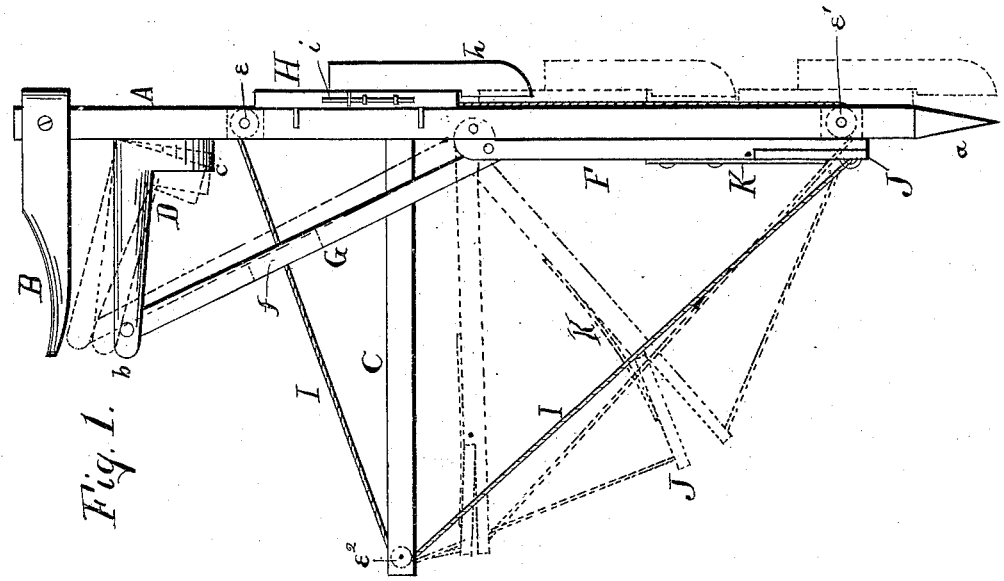
Fig. 1.
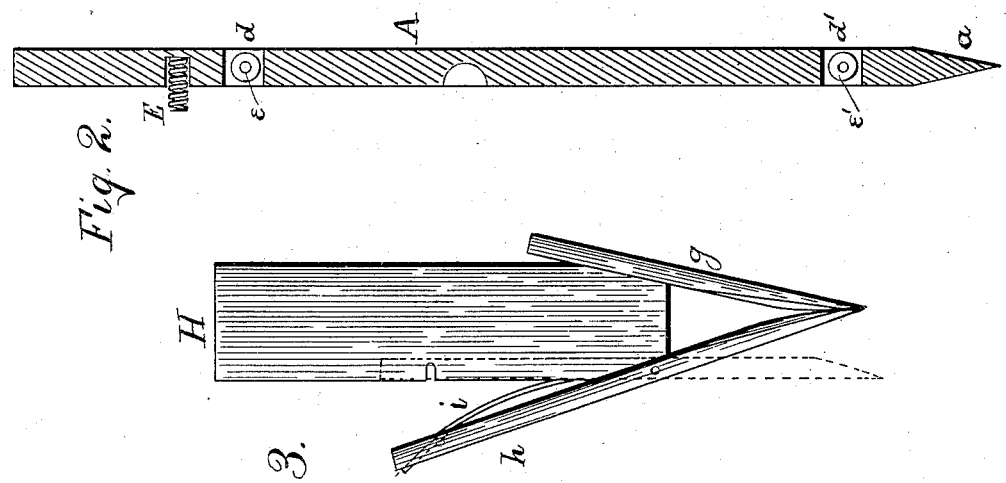
Fig. 2.
Fig. 3.
Witnesses.
Inventor.
John W. Hawkins.
By Soulé and Co.
Attorneys.

UNITED STATES PATENT OFFICE.

JOHN WILLIAM HAWKINS, OF MUNFORDVILLE, KENTUCKY.

TOBACCO-PLANT SETTER.

SPECIFICATION forming part of Letters Patent No. 331,498, dated December 1, 1885.

Application filed September 24, 1885. Serial No. 178,068. (No model.)

*To all whom it may concern:*

Be it known that I, JOHN W. HAWKINS, a citizen of the United States, residing at Munfordville, in the county of Hart and State of Kentucky, have invented certain new and useful Improvements in Tobacco-Plant Setters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to implements for setting tobacco and other plants, wherewith the plants may be conveniently and rapidly set without the necessity of stooping down to set each plant. It is illustrated in the drawings, in which—

Figure 1 is a side view of the planter. Fig. 2 is a vertical section of the main post, and Fig. 3 is a front view of the plant-carrier.

A is the main post of the setter, having a fixed handle, B, at the upper end, and having its lower end, $a$, sharpened in order that it may be pressed into the earth to form a hole for the reception of the root of the tobacco-plant. The handle B preferably stands out at right angles, as shown. Beneath the handle, near the center of the main post, a horizontal arm, C, is secured to the main post. Immediately below the handle B a bell-crank lever, D, is pivoted at its elbow to the main post. The long arm $b$ of this lever extends outward in a horizontal direction parallel with the handle, and the short arm $c$ stands vertically alongside the main post. A strong coiled spring, E, located in a cavity in the main post, is secured at opposite ends to the main post and short arm $c$ of lever D, respectively. The tension of this spring holds arm $c$ normally against the main post, and automatically returns it to its normal position when removed therefrom. Just below the horizontal arm C a swinging arm, F, is pivoted at its upper end to the main post, against which it normally rests in a vertical position, and its free end reaches down to or nearly down to the pointed end of the main post. A connecting-rod, G, pivoted at its upper end to the outer end of the long arm $b$ of lever D, connects said lever with the swinging arm F, being pivoted at its lower end to said swinging arm just below the point of connection of the latter with the main post. Owing to this connection between lever D and swinging arm F, a slight upward movement of the long arm of lever D will cause the lower free end of arm F to describe a large arc in an upward direction, and the extent of movement permitted the lever is sufficient to swing the free end of arm F up to the central fixed arm, C. On the removal of the force which elevates the long arm of lever D the swinging arm returns to its vertical position, partly by its own weight and partly by the force of the spring E.

On the side of the main post opposite to that on which the handle, lever, and swinging arm are located the sliding plant-carriage H is situated. This carriage is adapted to slide vertically along the main post, being held in proper position thereon by suitable guides. Between the lever D and horizontal arm C the main post is formed with a slot, $d$, in which is rotatively mounted a grooved roller, $e$, and near the lowest position of the free end of the swinging arm F the post is provided with another slot, $d'$, in which a similar roller, $e'$, is mounted. The arm C at its outer end carries a similar roller, $e^2$. A cord, I, secured to the carriage H and to the free end of swinging arm F, passes through slots $d$ $d$ and over rollers $e$ $e'$ $e^2$. The cord is so arranged in relation to carriage H and arm F that when the arm is in its normal lowered position the carriage is held in its extreme upward position, as shown in full lines in Fig. 1, and when the free end of arm F is elevated the carriage runs down the main post until it reaches the sharpened point $a$ thereof, which is the limit of its downward movement. In order to avoid the connecting-rod G, the cord passes through a longitudinal slot, $f$, cut therein. The plant is held in the carriage by a fixed gripper, $g$, and a movable gripper, $h$. The movable gripper is pivoted to the carriage, and is normally held in contact with gripper $g$ by a light spring, $i$.

In order that the cord I shall be held taut and still permit the swinging arm F to be freely turned on its pivot, one end of said cord is attached to the arm itself, while the other end is attached to the free end of a bar, J, which is pivoted at its upper end to the rear side of the arm F. This bar is normally held in contact with arm F by a spring, K, which is strong enough to hold the cord taut, but not too strong to permit the bar to swing easily away from the arm when the arm is carried upward.

In using this implement a hole is first made in the ground by means of the pointed end of the main post. A plant is then inserted between the grippers on the plant carriage, root downward. The main post is then rested on the ground near the hole, and the carriage is run down by raising the long arm of lever D, thus depositing the plant in the hole. The earth is then pressed around the plant, thus completing the setting of the plant. The lever is then released, and the coiled spring restores the parts to their normal position. The spring which holds the movable gripper is so light that the movable gripper swings back when the carriage is elevated without disturbing the plant.

I claim as my invention—

1. In a plant-setter, a main post pointed at its lower end, a handle fixed at the upper end thereof, a horizontal arm fixed to the main post near its center, a bell-crank lever pivoted at its elbow to the main post immmediately below the handle, a coiled spring fixed at opposite ends to the main post and the vertical arm of said lever, a swinging arm pivoted at its upper end to the main post, and a connecting-rod pivoted at one end to the end of the horizontal arm of the bell-crank lever and at its other end to the swinging-arm below the pivot thereof, in combination with a sliding plant-carriage, which slides up and down along the main post, rollers mounted near the upper and lower ends of the main post and at the outer end of said horizontal arm, and a cord which passes over said rollers and is attached to said carriage and to the free end of said swinging arm, substantially as set forth.

2. A post, and an arm fixed at right angles thereto, and a swinging arm pivoted near the point where said arm is secured to said post and adapted to swing between said post and arm, in combination with a spring-actuated bar, pivoted to said swinging arm near the free end thereof, and a cord attached at one end to the free end of said swinging arm and at the other end to said pivoted bar, said cord passing over or through said post and arm, substantially as set forth.

3. In a plant-setter, a main post and a sliding plant-carriage, which slides up and down along said post, in combination with a swinging arm and a cord attached to said carriage and to the free end of said swinging arm, substantially as set forth.

In testimony whereof I affix my signature in presence of two witnesses.

JOHN WILLIAM HAWKINS.

Witnesses:
W. B. EDWARDS,
M. GIBSON.